United States Patent
Hogue et al.

(10) Patent No.: US 7,547,182 B2
(45) Date of Patent: Jun. 16, 2009

(54) HIGH SPEED STICKER PLACER HAVING HORIZONTAL AND VERTICAL POSITIONING

(75) Inventors: Gary Wayne Hogue, West Linn, OR (US); Brian Cornelius Hogue, West Linn, OR (US)

(73) Assignee: Hogue Industries, LLC, West Linn, OR (US)

( * ) Notice: Subject to any disclaimer, the term of this patent is extended or adjusted under 35 U.S.C. 154(b) by 219 days.

(21) Appl. No.: 11/169,601

(22) Filed: Jun. 28, 2005

(65) Prior Publication Data

US 2006/0045723 A1   Mar. 2, 2006

Related U.S. Application Data

(60) Provisional application No. 60/583,623, filed on Jun. 30, 2004, provisional application No. 60/641,946, filed on Jan. 7, 2005.

(51) Int. Cl.
*B65G 57/00* (2006.01)
*B65G 57/22* (2006.01)

(52) U.S. Cl. .............. 414/789.5; 414/917; 414/791.6; 414/927

(58) Field of Classification Search ........... 414/789.5, 414/791.8, 793.8, 794.1, 794.3, 791.6, 917; 271/189; 403/62
See application file for complete search history.

(56) References Cited

U.S. PATENT DOCUMENTS

| | | | |
|---|---|---|---|
| 3,169,646 A | 2/1965 | Mason | |
| 3,606,310 A | 9/1971 | Larson | |
| 3,737,052 A | 6/1973 | Lunden | 214/6 DK |
| 3,887,087 A * | 6/1975 | Glaus et al. | 414/791.6 |
| 4,201,506 A | 5/1980 | Rysti | 414/68 |
| 4,264,253 A * | 4/1981 | Kennison | 414/789.5 |
| 4,274,781 A | 6/1981 | Rysti | 414/83 |
| 4,290,723 A | 9/1981 | Johansson | 414/83 |
| 4,878,803 A * | 11/1989 | Whiddon | 414/789.5 |
| 5,613,827 A | 3/1997 | Vande Linde | 414/791.6 |

(Continued)

OTHER PUBLICATIONS

Carbotech, Stacker Brochure, 2 pages.

(Continued)

*Primary Examiner*—Gregory W Adams
(74) *Attorney, Agent, or Firm*—Simple IP Law, P.C.; Craig R. Rogers

(57) ABSTRACT

A slat positioning and placing machine is preferably configured to place slats on top of or between accumulated material layers. A set of actuating arms preferably includes complementary operating slat holding holders, such as pans or other holding devices. As a first slat holder is inserting a slat into a material package being formulated, a second slat holder is preferably positioned to receive a slat. As the second slat holder is being positioned to insert the slat into the package, the first slat holder is preferably being cycled back to receive a slat. A controls methodology preferably electronically profiles the forward and rearward movement of the actuating arms. The raising and lowering functions can also be electronically profiled. The profiles can also preferably be adjusted to increase the cycle rates for various lengths being processed, and various cycling and positioning methods are contemplated. Sticker rake-off fingers can also be provided that move from a non-obstructing position to a rake-off position to help position stickers in the material package being formed.

34 Claims, 10 Drawing Sheets

U.S. PATENT DOCUMENTS

| | | | | | |
|---|---|---|---|---|---|
| 5,636,965 | A | * | 6/1997 | Newnes et al. | 414/789.5 |
| 5,964,570 | A | | 10/1999 | Dimion et al. | 414/791.6 |
| 6,371,720 | B1 | * | 4/2002 | Ouellette | 414/791.6 |
| 6,439,829 | B1 | * | 8/2002 | Johnson | 414/789.5 |
| 6,598,747 | B1 | | 7/2003 | Ahrens | 209/518 |
| 6,644,911 | B2 | * | 11/2003 | Humble et al. | 414/789.5 |
| 6,655,902 | B2 | | 12/2003 | Dube et al. | 414/789.5 |
| 2003/0031550 | A1 | | 2/2003 | Dube et al. | 414/789.5 |
| 2003/0082043 | A1 | * | 5/2003 | Lunden | 414/789.5 |

OTHER PUBLICATIONS

Carbotech, High-Speed Stacker Brochure, 2 pages.

Comact, Double fork high-speed stacker, http://www.comact.com/us/sawmill-product.php?nID=33, 2 pages.

Mill Tech Industries, Dual fork stacker, http://www.mill-tech-ind.com/products.php?cat=2, 1 page.

http://www.deltacompsys.com/dloads/downloads.php?category=appnotes, Forest Products Industry: Lumber Stacker, Apr. 7, 1998, 6 pages.

http://www.deltacompsys.com/dloads/downloads.php?category=rmc100&subcategory=, RMC100 Discrete 1/0 Command Mode, Apr. 16, 2001, 6 pages.

http://www.deltacompsys.com, RMC100 Series Two, Four, Six, and Eight Axis Servo Motion Controllers, Feb. 12, 2001, 32 pages.

MTS Temposonics Applications, 1996, 21 pages.

Temposonics—Compatible Products, 1997, 13 pages.

Figure 127 of 507 Mechanical Movements, 1868, 3 pages.

\* cited by examiner

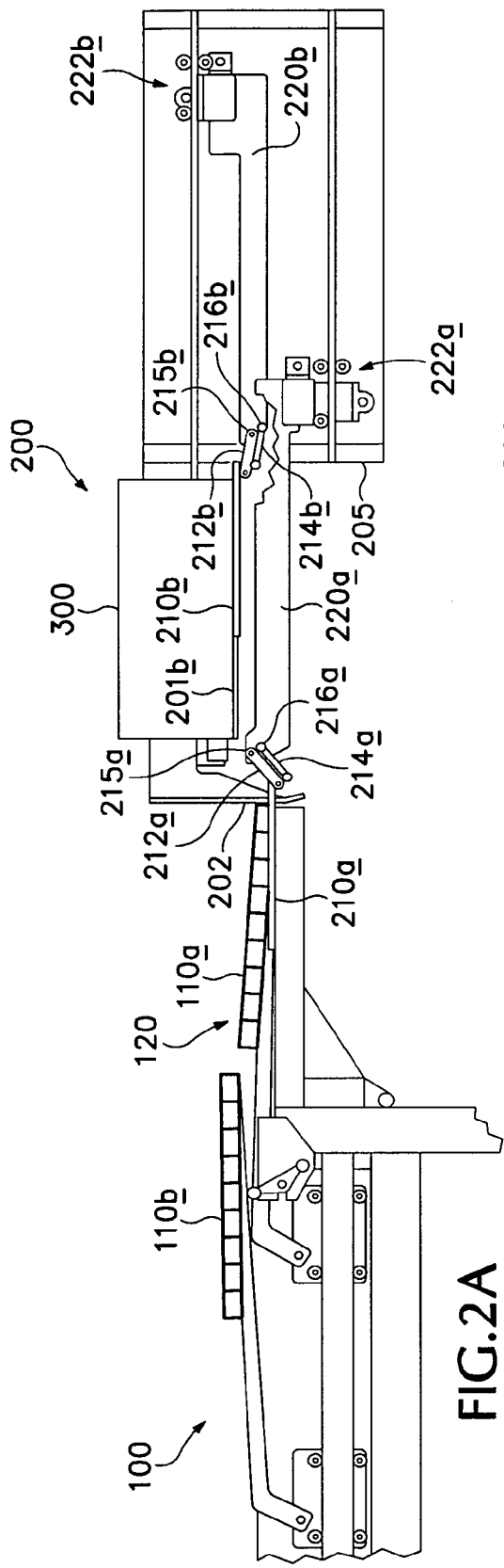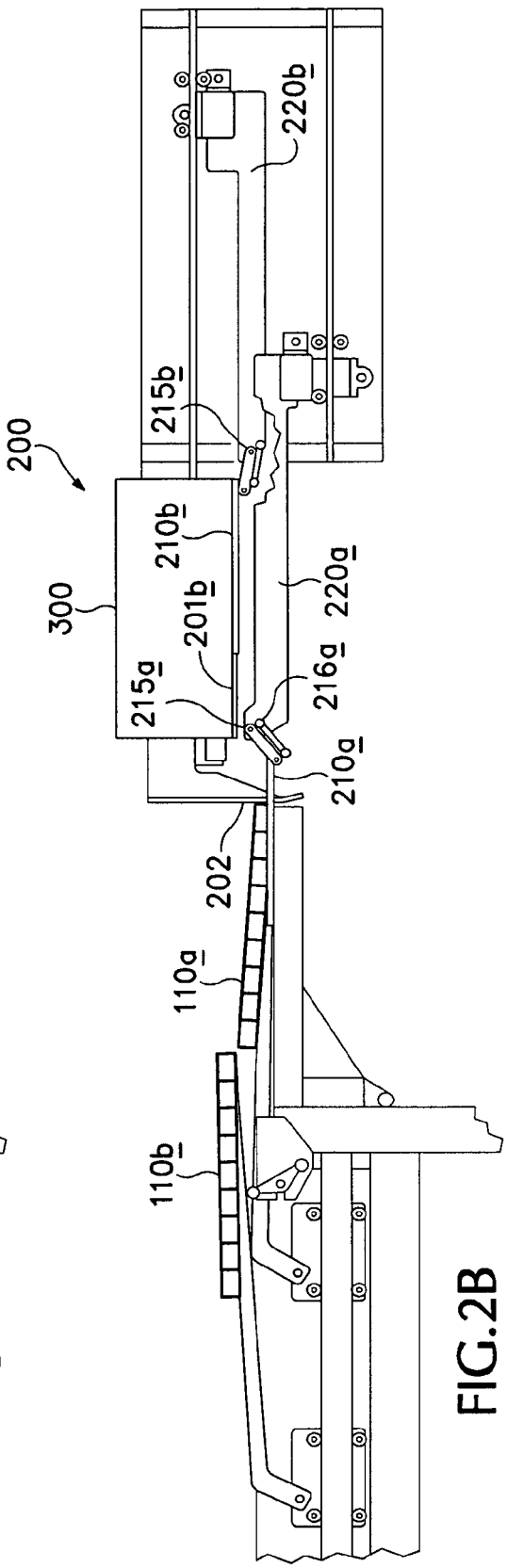

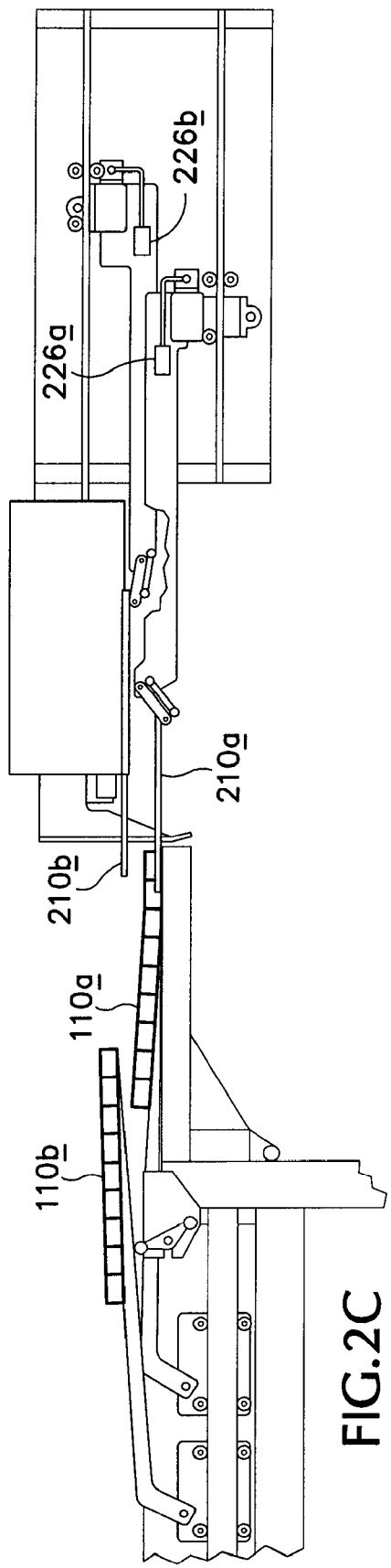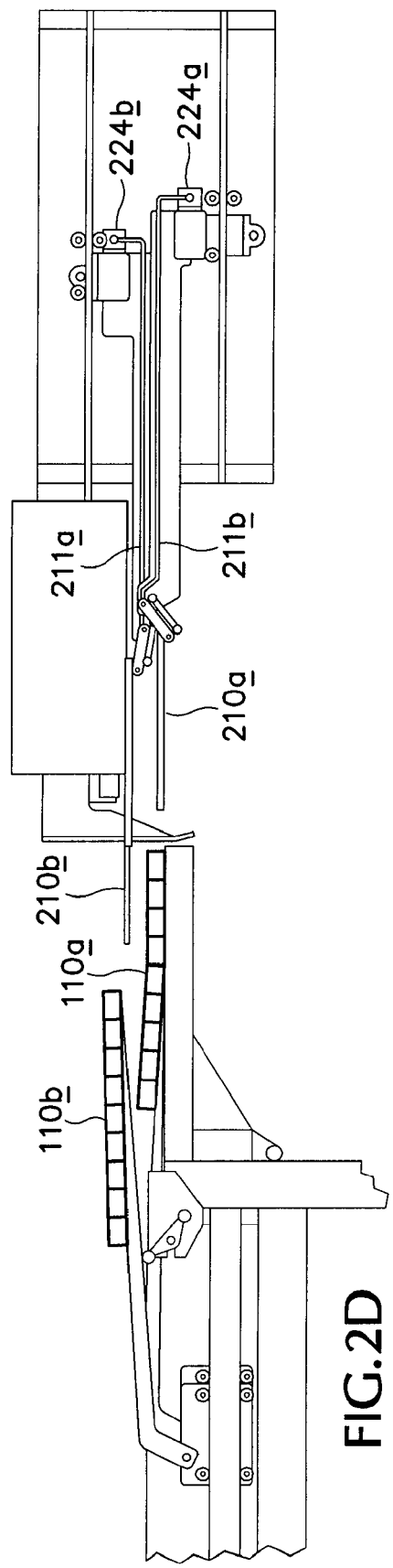
FIG.2C
FIG.2D

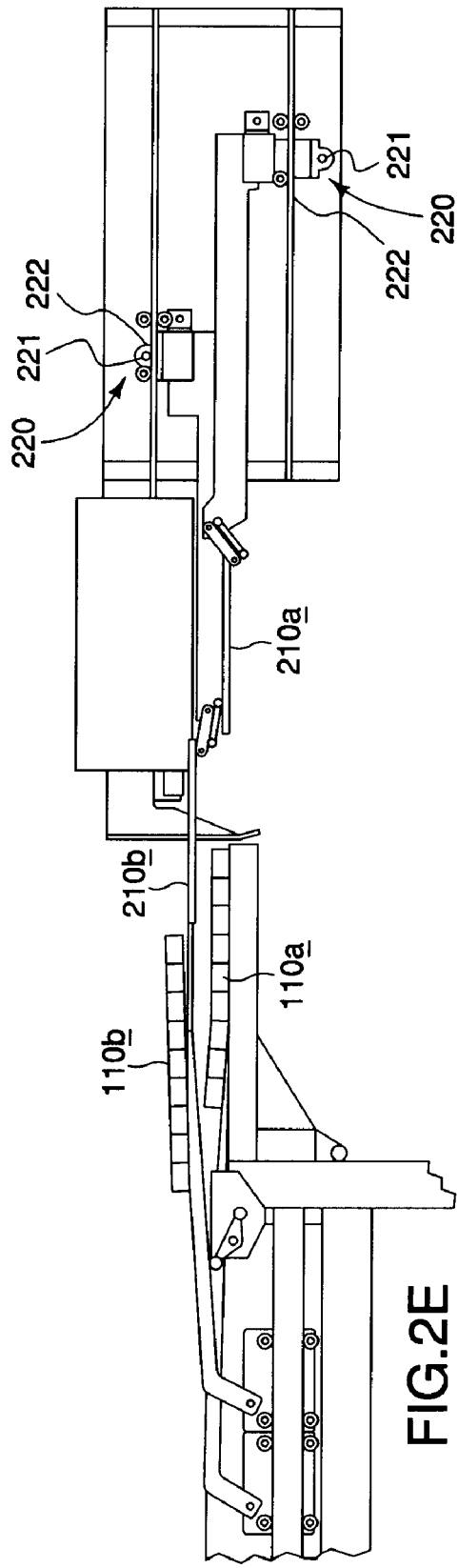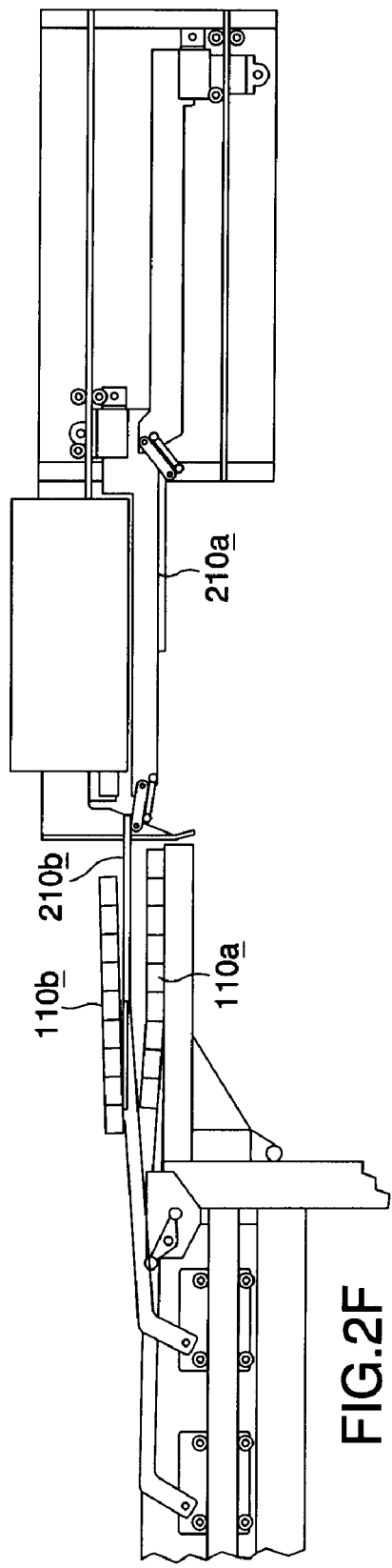

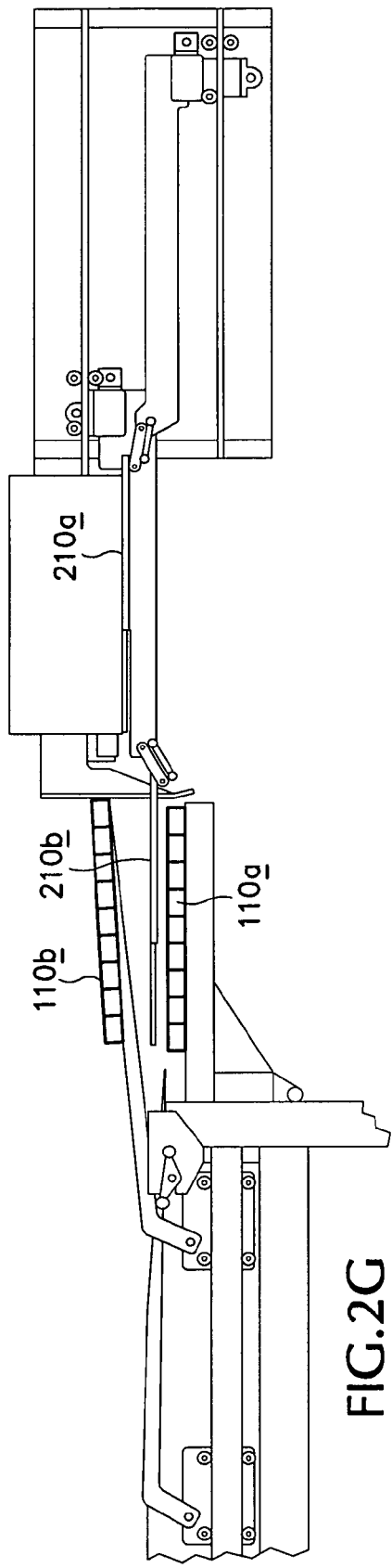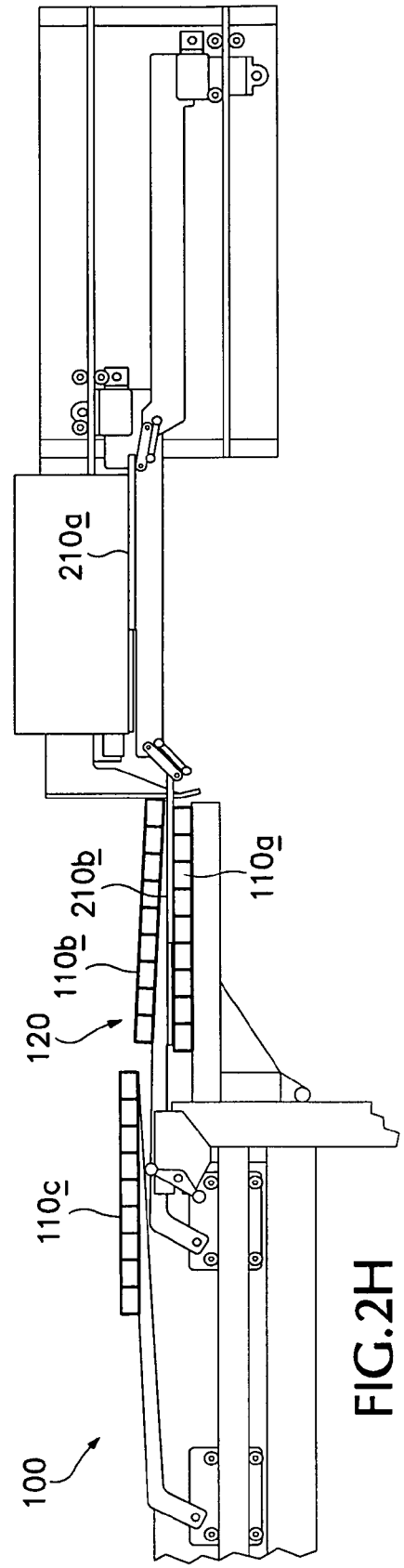

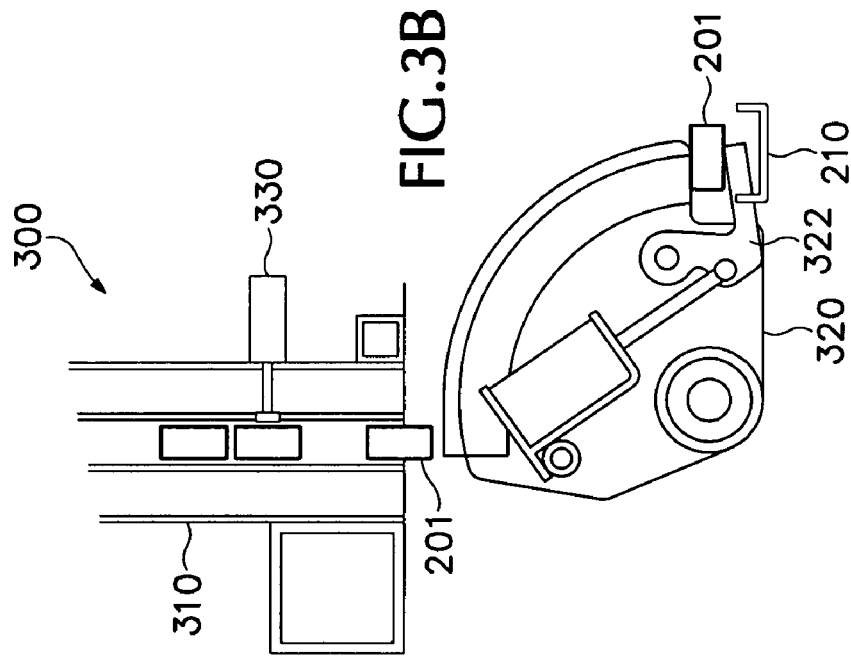
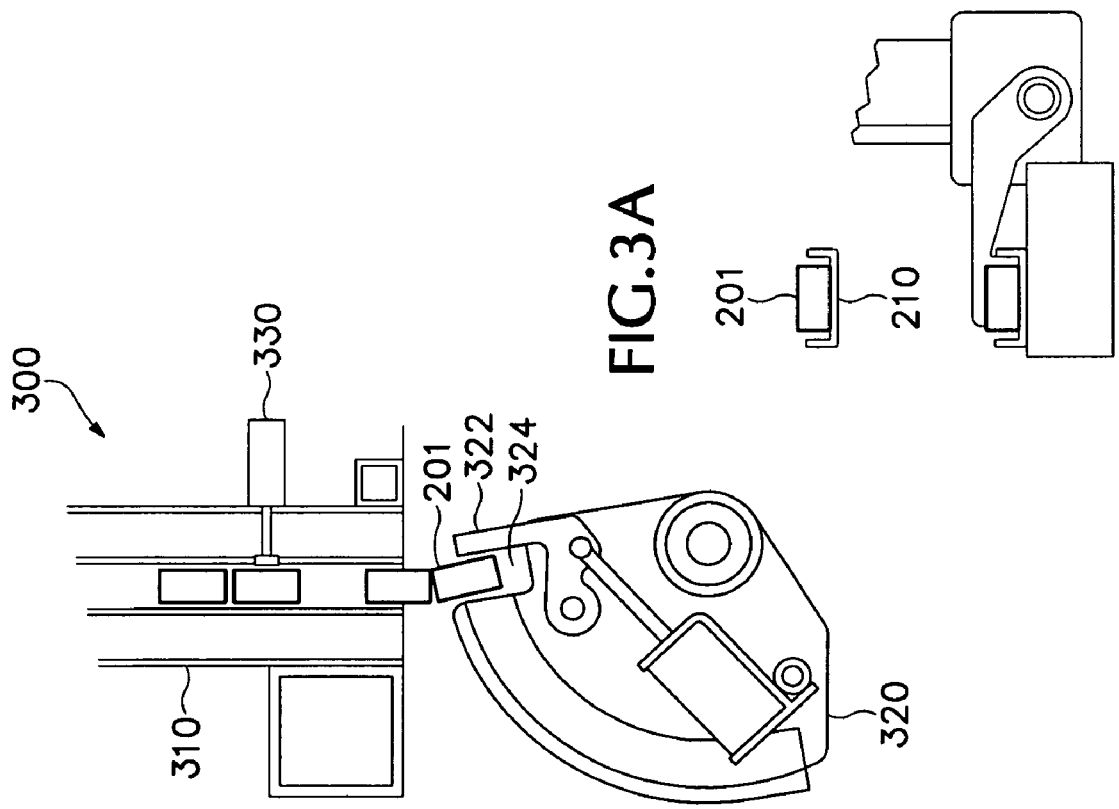

SCANNING/SENSING SYSTEM ated speed of conventional equipment for feeding material layers to lumber stackers has been increased. Unfortunately, this has resulted in bottlenecks and inefficiencies at the stacker/slat layer machinery. The industry is therefore in need of a method and apparatus that permits stickers (also referred to as "slats" or "spacers") to be positioned between layers of material at an increased rate.

HIGH SPEED STICKER PLACER HAVING HORIZONTAL AND VERTICAL POSITIONING

This application claims priority from U.S. Provisional Application Ser. No. 60/583,623, filed Jun. 30, 2004, and U.S. Provisional Application Ser. No. 60/641,946, filed Jan. 7, 2005, the contents of which are incorporated herein by reference in their entirety.

BACKGROUND OF THE INVENTION

1. Field of the Invention

The present invention relates to a method and apparatus for inserting stickers (or "slats") between layers (or "courses") of lumber or other materials. More particularly, the principles of the present invention may assist in creating a material package that is ready for subsequent handling and/or shipping; for example, for further processing or delivery to a downstream user. Principles of the present invention also relate to a method and apparatus for identifying defective stickers, as well as a method and apparatus for removing defective stickers from a sticker placer.

2. Related Art

For manufacturing materials (such as lumber or other materials) that need to be dried, slats are typically inserted between layers of the material to allow for improved airflow between the layers and therefore permit better drying. When inserting slats, it is generally important to position the slats at closely held vertical positions in relation to the material layers. It is also generally important for the slat placing machinery to be able to keep up with the slat feeding machinery as well as the rest of the material stacking machinery.

In lumber manufacturing sawmills in particular, the operating speed of conventional equipment for feeding material layers to lumber stackers has been increased. Unfortunately, this has resulted in bottlenecks and inefficiencies at the stacker/slat layer machinery. The industry is therefore in need of a method and apparatus that permits stickers (also referred to as "slats" or "spacers") to be positioned between layers of material at an increased rate.

Conventionally, a "stickered" package of lumber is created by arranging a set of slat magazines over the layers of lumber being stacked and by dropping or placing a set of slats from the slat magazines onto the top layer either manually or automatically. Conventional single-carriage slat insertion type machines also exist that place the slats between the layers being stacked. The process of placing or dropping slats on the top layer is typically repeated as the lumber is stacked until the desired number of courses has been set and a full stickered package has been created.

Lumber is generally 4' to 28' in length, 1" to 6" in thickness, and 3" to 15" in width. This lumber is conventionally gathered and formulated into packages ranging from 42" to 120" in width and 50 to 75 layers high, or more. These packages require robust machinery to stack the lumber courses and arrange slats between the layers in an efficient manner at a very high speed. Efficient operation also requires a balance of low maintenance and minimal tuning during operation. Maintaining maximum "up time" enables maximum overall production output. It would therefore be desirable to have a high speed sticker placer that provides a reliable, accurate, and low maintenance mechanism for placing slats between layers.

Additionally, conventional sticker placers lack the ability to effectively identify and eliminate defective slats from the process. Defective slats can create problems in the machinery, including jamming or ineffective slat placement. Such problems also require increased manual intervention and increase maintenance and down-time. It would also be desirable, therefore, to have a method and apparatus for eliminating the presence of defective slats before placement in the material package.

SUMMARY OF THE INVENTION

According to various principles of the present invention, a high-speed, dual-carriage slat insertion and positioning machine is preferably capable of operating at a considerably higher speed than conventional single-carriage designs. A high-speed slat insertion and positioning machine according to these inventive principles can, for example, be configured for use with a single- or dual-carriage lumber-stacking machine and is preferably competitive in cost to build. Various principles of this invention can be achieved, for instance, through the use of one or more simplified, positive actuating mechanisms utilizing a higher level of electronic, mechanical, pneumatic, and/or other controls.

Conventional single-mechanism slat placer systems are generally capable of an average of only 15 cycles per minute. Modern mills, however, generally need a supply of approximately 20 to 30 courses per minute or more to stay competitive and efficient. The ability to place slats at such a high rate has been unavailable through conventional mechanisms, but is readily achieved through application of the principles of the present invention. A slat placing apparatus constructed according to the principles of this invention, for example, can preferably obtain cycle rates of around 35 to 40 layers per minute or more, depending on the piece sizes being handled. Furthermore, a device constructed according to various principles of the present invention also preferably experiences fewer timing and maintenance issues.

Dual slat placing arms on the dual-carriage sticker placer help satisfy the industry need for increased operating speed. In addition, however, it is advantageous to utilize a simple, electronically-controlled actuation mechanism to move the arms forward and rearward while precisely controlling the velocity using electronic ramping. These features help provide low maintenance while meeting the industry's high production requirements. Simplified mechanics and controls also provide a much higher performing mechanism with greater operation up time, along with corresponding lower maintenance and tuning costs.

The principles of the present invention also contemplate the use of a scanning/sensing device, or devices, utilizing electrical and/or electronic controls. The scanning device is preferably used in a mechanical stick gathering, sticker placing, and/or lumber drying application and preferably detects physical properties of stickers (such as lumber dry kiln stickers) in order to determine whether to accept or reject them.

In particular, the shape, moisture content, and/or icy condition of the stickers is preferably determined when processing them for placement between layers of lumber (or other materials). Avoiding irregular shapes, excessively moist stickers, or icy stickers is generally important for instance, to properly process the stickers through the machinery and/or to avoid detrimentally affecting the lumber drying process. If the stickers have physical properties, for example, that may cause them to jamb or misfeed in automatic gathering or sticker placing machinery, it causes down time and increased maintenance. Likewise, if the stickers have physical properties that cause poor performance in the lumber drying process, it may be costly in terms of degradation in lumber quality and may also increase processing time requirements.

Therefore, according to a preferred aspect of this invention, a scanning device preferably scans and/or senses the sticker to evaluate one or more of its physical properties. The scanning device is preferably in communication with, or integrated with, a sorting mechanism that either allows the scanned sticker to continue through the process, or rejects it out of the system depending on a result of the scanning/sensing process.

The scanning device may, for instance, utilize photo-cells, laser detectors, moisture detectors, mechanical shoes with encoders, or any number of other sensing methods or devices to detect the shape and condition of the stickers and process them accordingly. The scanning device may further be utilized in any desired location where the stickers are processed, such as in the course of stacking and sticking lumber, drying lumber, or destickering the loads and gathering the stickers after drying for further processing.

BRIEF DESCRIPTION OF THE DRAWINGS

FIG. 2A is a somewhat schematic side view of a sticker placer according to another preferred aspect of the present invention, shown having operating components in a first position and further shown in an operating relationship with a lumber stacker;

FIG. 2B is a somewhat schematic side view of the sticker placer of FIG. 2A, shown having operating components arranged in a second position;

FIG. 2C is a somewhat schematic side view of the sticker placer of FIG. 2A, shown having operating components arranged in a third position;

FIG. 2D is a somewhat schematic side view of the sticker placer of FIG. 2A, shown having operating components arranged in a fourth position;

FIG. 2E is a somewhat schematic side view of the sticker placer of FIG. 2A, shown having operating components arranged in a fifth position;

FIG. 2F is a somewhat schematic side view of the sticker placer of FIG. 2A, shown having operating components arranged in a sixth position;

FIG. 2G is a somewhat schematic side view of the sticker placer of FIG. 2A, shown having operating components arranged in a seventh position;

FIG. 2H is a somewhat schematic side view of the sticker placer of FIG. 2A, shown having operating components arranged in an eighth position;

FIGS. 3A-D are somewhat schematic side views showing various operating positions of a rotary diverter configured for use in the sticker placer of FIG. 2A, according to yet another aspect of the present invention;

DETAILED DESCRIPTION

According to various principles of the present invention, an improved sticker placing method and apparatus enables the creation of "stickered" packages of lumber or other materials at a faster rate than previous methods. A slat positioning and placing machine, for instance, can be used in placing a set of slats on top of, or between, accumulated layers (or "courses") of lumber or other material as they are being stacked. The courses may be stacked in a substantially vertical alignment, layer after layer, on top of one another to formulate a material package. Rows of slats are preferably arranged between adjacent material layers. A scanning and/or sensing mechanism can be used to detect and eliminate defective slats from the process. Various aspects and embodiments of the present invention will now be described in greater detail with reference to the accompany drawings.

Figure 1:
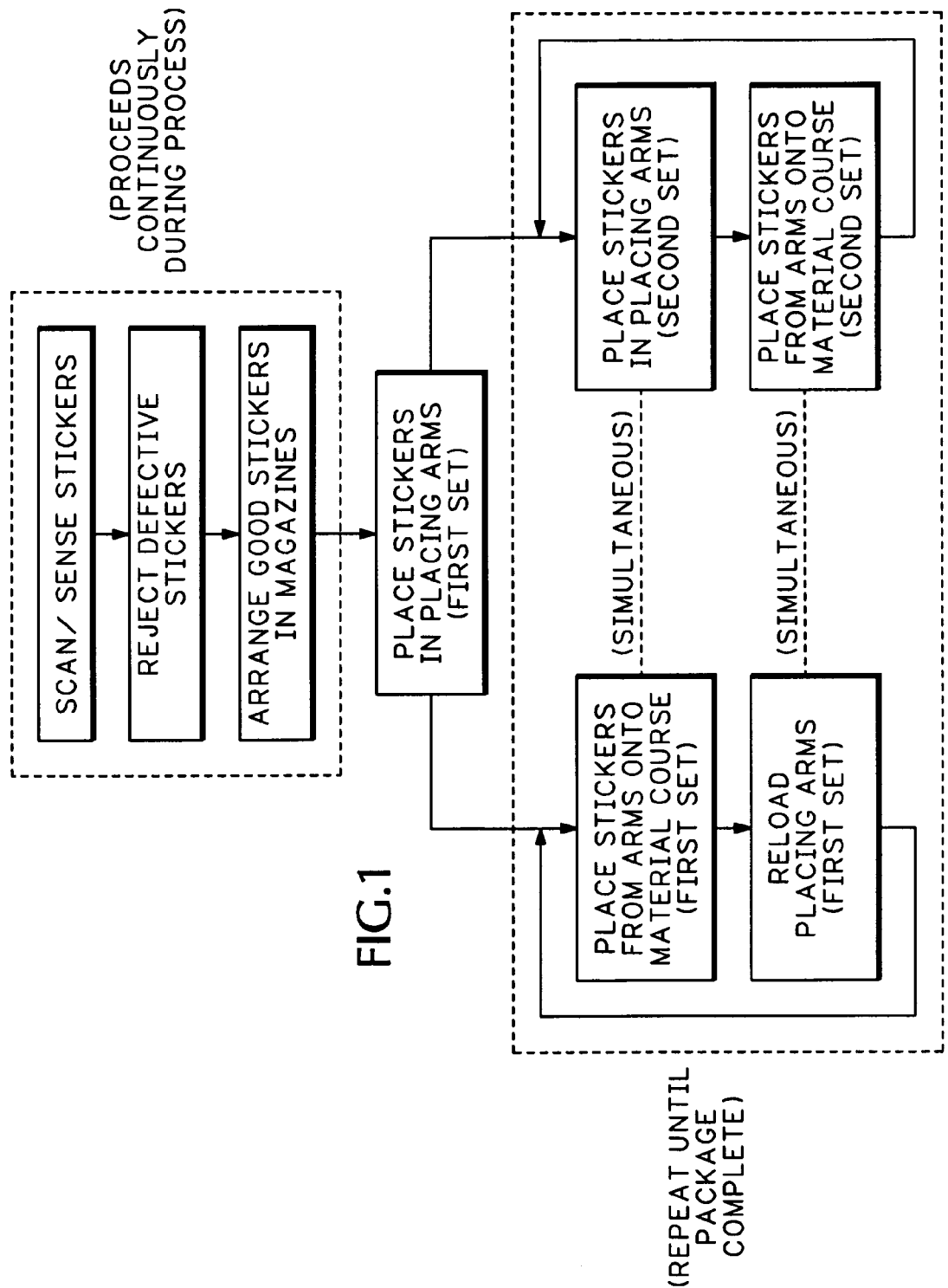
FIG. 1 is a schematic flow diagram illustrating a process for placing stickers according to a preferred embodiment of the present invention.
Figure 3D:
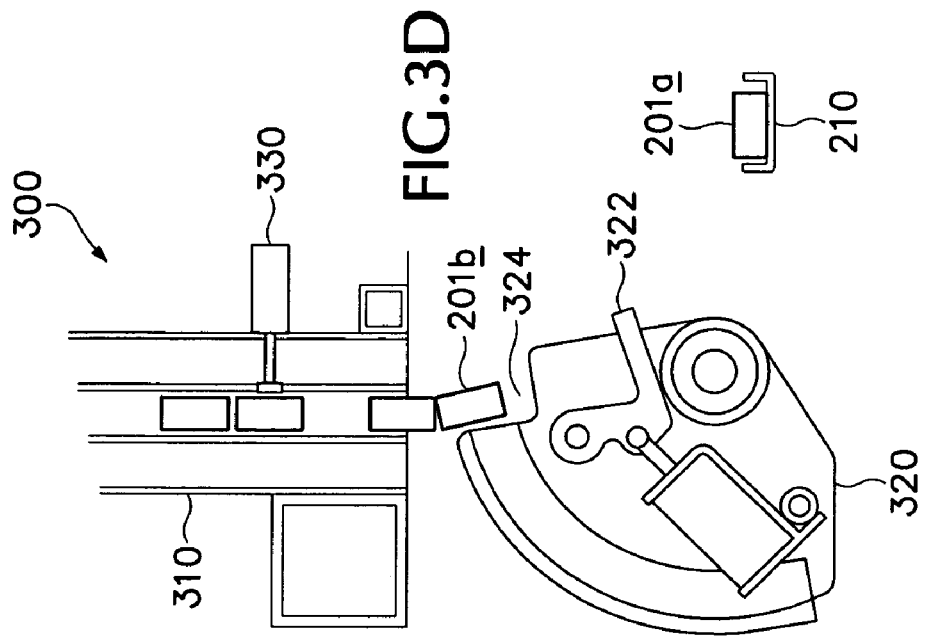
Figure 3C:
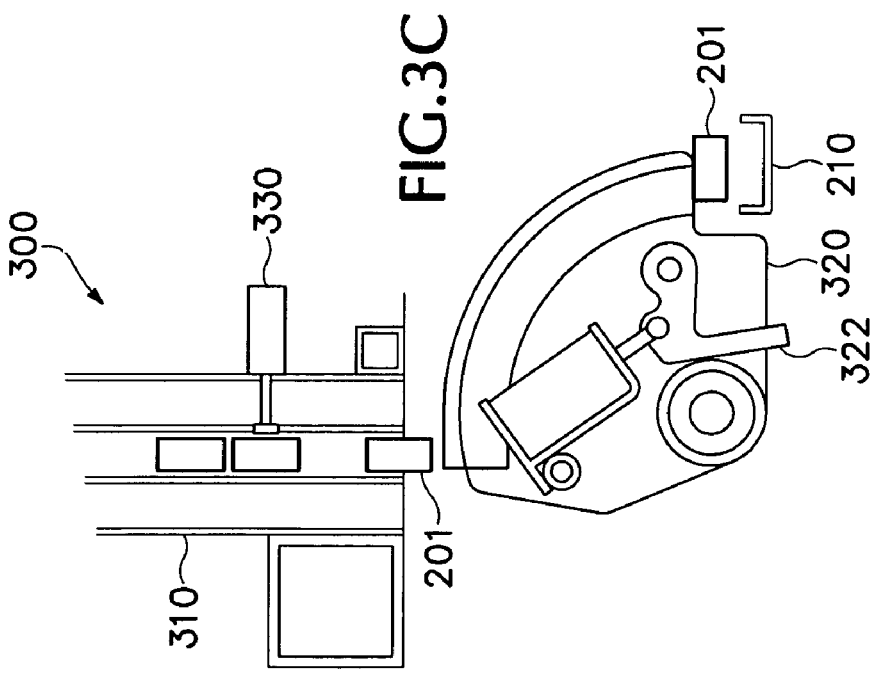

FIG. 1 is a schematic flow diagram illustrating a method of placing stickers in a material package being formulated according to a preferred aspect of the present invention. Referring to FIG. 1, in one method for placing stickers in a material package, incoming stickers are preferably scanned and/or sensed to identify defective stickers. Defective stickers can be rejected from the system while good stickers should be permitted to pass through to sticker accumulator magazines.

A set of stickers are then preferably supplied to a first set of sticker placer arms from a sticker supply, such as the sticker accumulators. Once loaded, the first set of sticker placer arms are moved forward to position the stickers in a material package being formed. As the first set of sticker placer arms are being moved to a forward position, a second set of sticker placer arms are preferably being moved into a position to receive stickers from the supply. After the first set of sticker arms have deposited the stickers on the material layer (or between layers), the first set of sticker arms return to receive additional stickers from the accumulators and the second set of sticker arms move forward to deposit the next set of stickers. This process is preferably repeated until a complete stickered material package has been created.

The first and second arms preferably remain aligned in the same vertical plane. Vertical movement of the first and second arms is preferably precisely controlled to prevent the arms from interfering with each other during their forward and rearward travel. Most preferably, movement of the sticker placer arms is accomplished through direct, positive actuating mechanisms such as linear drive systems, pneumatic or hydraulic actuators, or other similar mechanisms. Control of the actuating mechanisms is preferably provided through an electronic control system that profiles the forward and rearward movement of the sticker placer arms. Vertical positioning of the sticker placer arms is also preferably provided through one or more positive actuating mechanisms. The electronic profiling of the sticker placer arm movement can provide precise control of the vertical and horizontal positions of the arms throughout their motion.

FIGS. 2A-2H are somewhat schematic side views illustrating operation of a sticker placer 200 according to another aspect of the present invention. Referring to FIGS. 2A-2H, a dual-carriage slat placing mechanism 200 preferably includes a slat infeed section 300, dual-carriage slat placing pans 210a/210b, and various control mechanisms. The dual-carriage slat placing mechanism 200 preferably includes a structural steel frame 205 and dual-carriage arms 220a/220b, and forward and rearward mechanics 222a/222b. Link arms 211a/211b connect slat pan raising and lowering shafts 224a/224b to raising and lowering linkages 212a/212b in conjunction with positioners 226a/226b. Forward and rearward slat pans 210a/

210b, parallel linkages 214a/214b, and slat rake off stops 202 are also preferably included. The controls (not shown) preferably include PLC or PC type positioning and sequencing software, PLC or PC type of hardware, and an operator's console.

In this embodiment, the dual-carriage slat placing apparatus 200 preferably contains two sets of slat placing pans 210a/210b that work complementary to one another. In a lumber stacker 100, each course of lumber 110 is picked up and stacked one course at a time, while the sticks 201 are dropped or inserted onto, or under the unsettled top layer 110a. Dual sets of parallel actuating arms 220a/220b having complementarily arranged slat holding pans 210a/210b are preferably arranged such that the first and second set of slats 201a/201b are in the same vertical plane. The slat pans 210a/210b are preferably initially positioned such that one of the pans (e.g., 210b) is located in communication with a slat feeding device 300 that loads a slat 201b into the pan 210b. After receiving the slat 201b, the slat pan 210b then deliver the slat 201b to the package 120 being formulated.

Through forward and rearward positioning of the actuating arms 220a/220b, the slats 201a/201b are placed into the slat pans 210a/210b and then inserted into the package 120 being formulated, until the entire package is complete. By using complementary sets of slat pans 210a/210b, as a first set of slat pans 210a is positioned forward to insert the slats 210a into the package 120 being formulated, a second set of slat pans 210b is preferably positioned to receive a set of slats 201b from the slat feeding mechanism 300. Likewise, when the second set of slats 210b is thereafter moved forward to insert the second set of slats 201b beneath the next layer 110b of the package 120 being formulated, the initial set of slat pans 210a is cycling back to pick up a subsequent set of slats, and the process is then repeated.

Sticker rake-off stops or fingers 202 are preferably configured to move (such as through cam, rotational, linear, or other movement) into position proximal to the sticker pans 210a/210b after the sticker pans insert the stickers 210a/201b into position on the material package 120. As a sticker pan 210a retracts, the rake-off finger 202 preferably contacts the sticker 201a to ensure that the sticker 201a is held in place within the package 120 while the sticker pan 210a is retracted. The rake-off finger 202 is then preferably moved out of the way before the next sticker pan 210b approaches to ensure that it does not obstruct or interfere with the positioning of a subsequent sticker 201b into the package 120.

The rake-off fingers 202 could be actuated in any acceptable manner, for instance, using a rack and pinion system, pneumatic control, or any other method capable of transitioning the fingers 202 between its engaged and disengaged positions. The rake-off fingers 202 can also, for example, be independently or collectively actuated.

The dual-carriage slat placing machine of this embodiment therefore preferably provides complementary-operating slat placing arms. The apparatus preferably inserts an initial set of slats into the material package while a rear set of pans is being loaded with the next set of slats in preparation for inserting them into the next layer of lumber to be stacked. After the first set of stickers are placed in the package, the stickers loaded into the rearward set of sticker pans are preferably moved forward and placed under the next layer about to be arranged on the package being formulated. More particularly, the rear sticker pans move forward with the stickers while the front pans are moved in the opposite direction ultimately ending up in the position where the rear pans had previously been. The process is repeated until the desired package size has been achieved. During the loading operation, the set of slat pans is located out of the critical path of the lumber stacker.

Providing complementary-operating slat pans significantly speeds up the rate at which slats can be inserted between (or onto) layers of material being stacked. The dual slat pan assemblies can, for example, be independently positioned or tied to a common positioning mechanism. They can further, but need not, be raised and lowered with another common mechanism. Common mechanisms can be used, for instance, to help attain the proper clearances within the layers being formulated.

To operate the two sets of slat arms complementary to one another, this design can, for example, utilize a rack and pinion system 220 to position the slat arms back and forth horizontally. The complementary motion is preferably created by the relationship of the arms to the location of the pinion gears 221. As the pinion gear 221 moves in a forward motion the slat pans that are attached to the top of the pinion gear move forward while the slat pans that are attached to the bottom portion of the pinion gear move backwards. Separate pinion gear shafts with individual gear racks 222 are another way to accomplish this motion.

Once the course of lumber 110 has reached the location of where the lumber package 120 is being built, the sticker pan linkage arms 212a and 214a preferably lower, thereby lowering the sticker pans 210 and setting the stickers 201 in place. When the second set of sticker pan linkage arms 212b and 214b are lowered, the first set of stacker lift arms 212a and 214a are raised to position the first set of pans 210a to receive the next series of stickers 201a. To achieve the vertical motion of the dual slat pans, the system can further preferably utilize one or more positioning arms that raise and lower the pans to the proper vertical position. The slat pans 210a/201b can, for example, be configured to achieve their appropriate vertical positioning by having a linkage arm 212a/212b, 214a/214b that pivots about a rearward pivot point 215a/215b, 216a/216b, or they may be arranged in a more direct relationship with a positioning mechanism.

In operation, as the layers of lumber are being stacked, the stickers, or slats, are placed between (or onto) the layers under the precise control of the electronic control system. Where a common positioning mechanism is used, the controls methodology preferably electronically profiles the velocities appropriate for the extension of one set of slat pan actuators in the forward direction to be accomplished while the other set of slat conveyor pans is returning to the retracted position. Electronic profiling of the arm motion can also be separately provided for each slat arm or each set of slat arms using independently controlled positioners for each arm or set of arms.

The electronic profiling preferably further directs the raising and lowering functions of the slat pan actuators. The control system can preferably electronically track the position of the slat arms during their course of forward and rearward travel as well as control the raising and lowering of the slat pans in correlation with their position of travel. More particularly, electronic control system preferably tracks the forward and rearward positioning of the slat pans and controls the raising and lowering of the arms in relation to their horizontal positioning. This enables the opposing arms to miss one another while cycling and yet be in the correct position to receive slats while in their rearward position and the correct position to deposit them onto the layers being formulated in the forward position.

Precise electronic control also enables the forward traveling slat pan arms to increase and decrease in speed during the course of their travel while simultaneously raising and lowering the arms to properly place the slat into or onto the package layer being placed. At the same time, the rearward arms can be raised and positioned to receive an accumulated set of slats. The rearward arms can then be moved forward at carefully controlled, variable speeds, as well as be raised and lowered at the appropriate positions, to place the next set of stickers in the package while the original arms are being retracted. This enables the slats to be arranged and trapped in a very precise location between the layers of lumber.

Electronic positioning strips or detection devices (not shown) can be located in or be arranged independently of the positioning device(s). The positioning device(s) can, for instance, be pneumatic or hydraulic cylinder(s), a servo type of positioning motor drive, or a electric motor drive with variable frequency internal or external positioning capability. Combinations of these types of positioners may also be used to accomplish the forward and rearward pan movement and the simultaneous raising and lowering of the pans.

FIGS. 3A-3D are somewhat schematic side views illustrating operation of a slat infeed section 300 for supplying stickers to the sticker placer 200 according to a further aspect of the present invention. In this embodiment, a placement device (e.g., rotary diverter 320) transfers slats from a slat magazine to the slat pan. In an alternative embodiment, the placement device could transfer the slat directly from a conveyor belt. In yet another embodiment, a slat pan loading means could utilize a release device to release the slats from the slat accumulation magazine directly into the slat pans and the slat placement device 320 could be omitted entirely.

Referring to FIGS. 3A-3D, the slat infeed section 300 preferably includes slat accumulation magazines 310, a slat staging mechanism 330, and a slat-placing mechanism 320 for placing slats in the slat pans 210. The slat placing mechanism 320 can be a rotary diverter. The rotary diverters 320 preferably operate as a slat-placing mechanism that takes stickers 201 from the slat accumulation magazines 310 and places them into the slat pans 210. The slat accumulation magazines 310 can, for instance, be vertically-oriented or arranged offset from vertical by a predetermined angle. The magazines 310 can further be separate magazines for each arm pair or combined to supply slats to multiple arm pairs.

More particularly, the rotary diverters 320 preferably rotate from a slat accepting position (see FIG. 3A) to a slat placing position (see FIG. 3C) and include a slat finger device 322 to hold the slat 201 in place during rotational movement of the diverters 320. In a slat accepting position, slats 201 are received into the rotary diverter 320 and held in position by the slat finger 322. The diverter 320 is then preferably rotated into a slat placing position with the slat 201 located into proximity to a slat pan 210. The slat finger device 322 is then preferably rotated or otherwise retracted to enable the slat 201 to drop, slide, or otherwise transition into the slat pan 210. At this stage, the rotary diverter 320 is preferably rotated back into a slat accepting position with the finger 322 still retracted. A slat 201 is then permitted to drop into the diverter receiving section 324 and the finger 322 is engaged to hold the slat 201 in place. This process is repeated to arrange additional stickers in the slat pans as they return from delivering the previous set of stickers to the material package.

Figure 4:
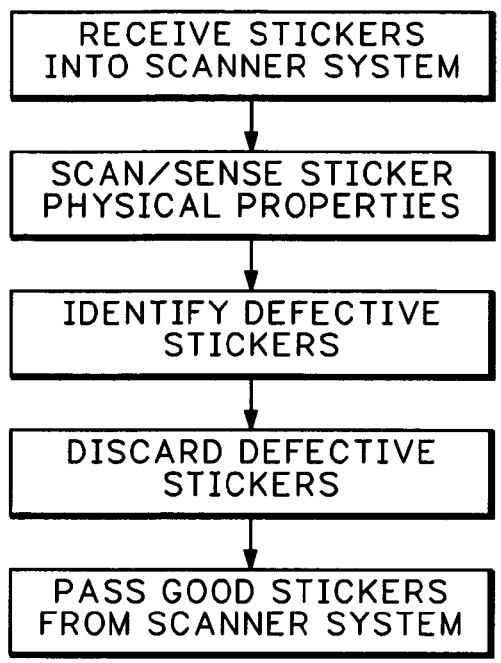
FIG. 4 is a schematic flow diagram illustrating a method for sensing and selecting stickers for use in a sticker placing mechanism according to a still further aspect of the present invention.
Figure 5:
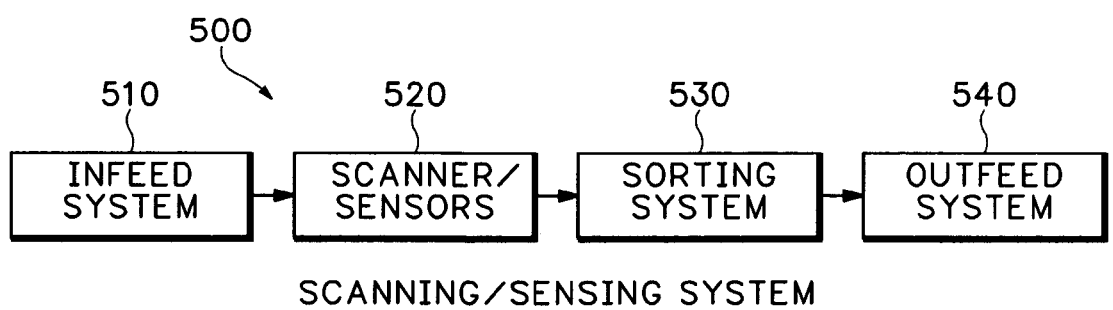
FIG. 5 is a somewhat schematic block diagram illustrating the primary components of a sticker sensing and sorting mechanism according to a still further aspect of the present invention.
Figure 6:
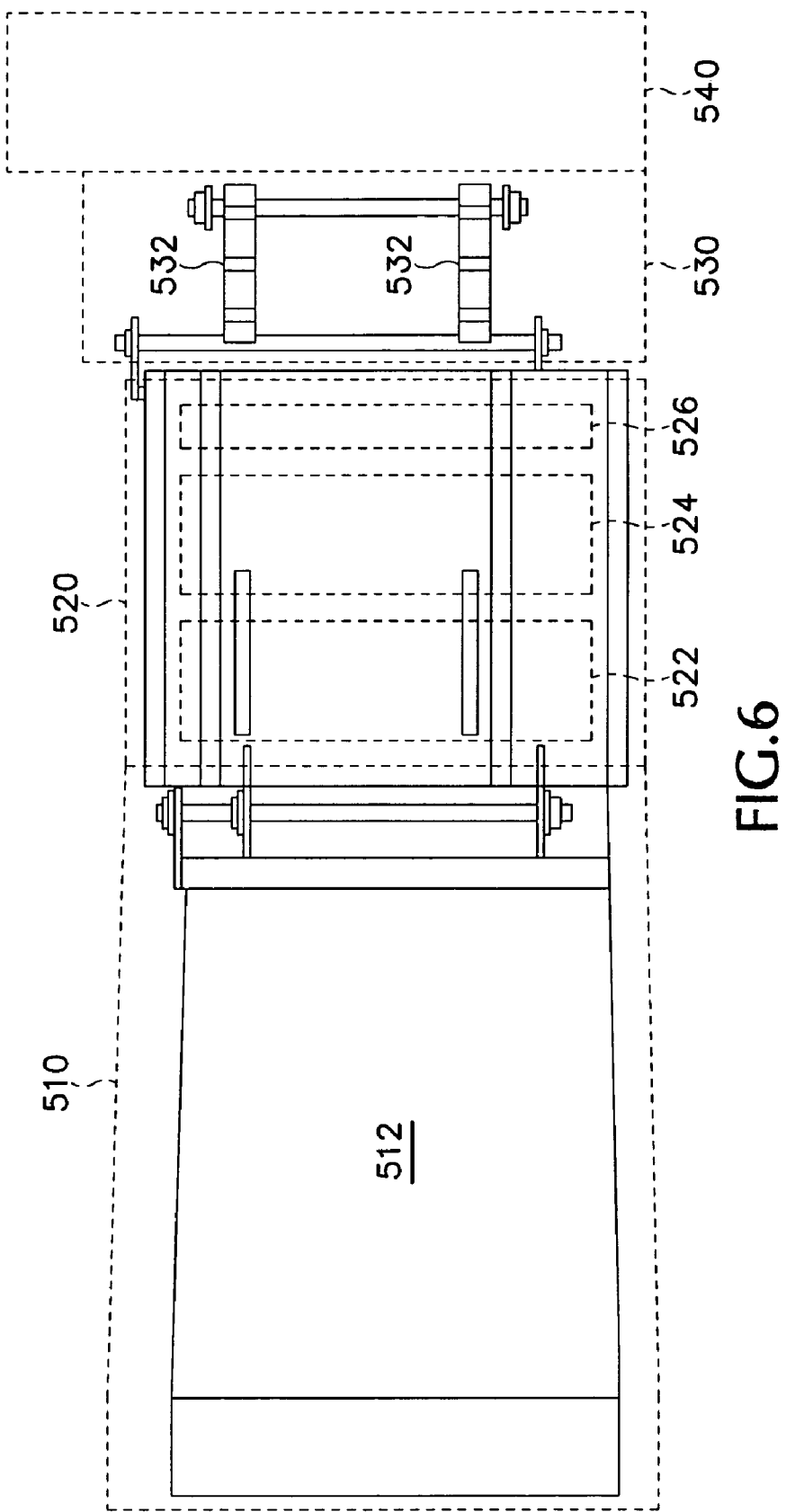
FIG. 6 is a somewhat schematic top view of a sticker sensing and sorting mechanism according to yet another aspect of the present invention.
Figure 7:
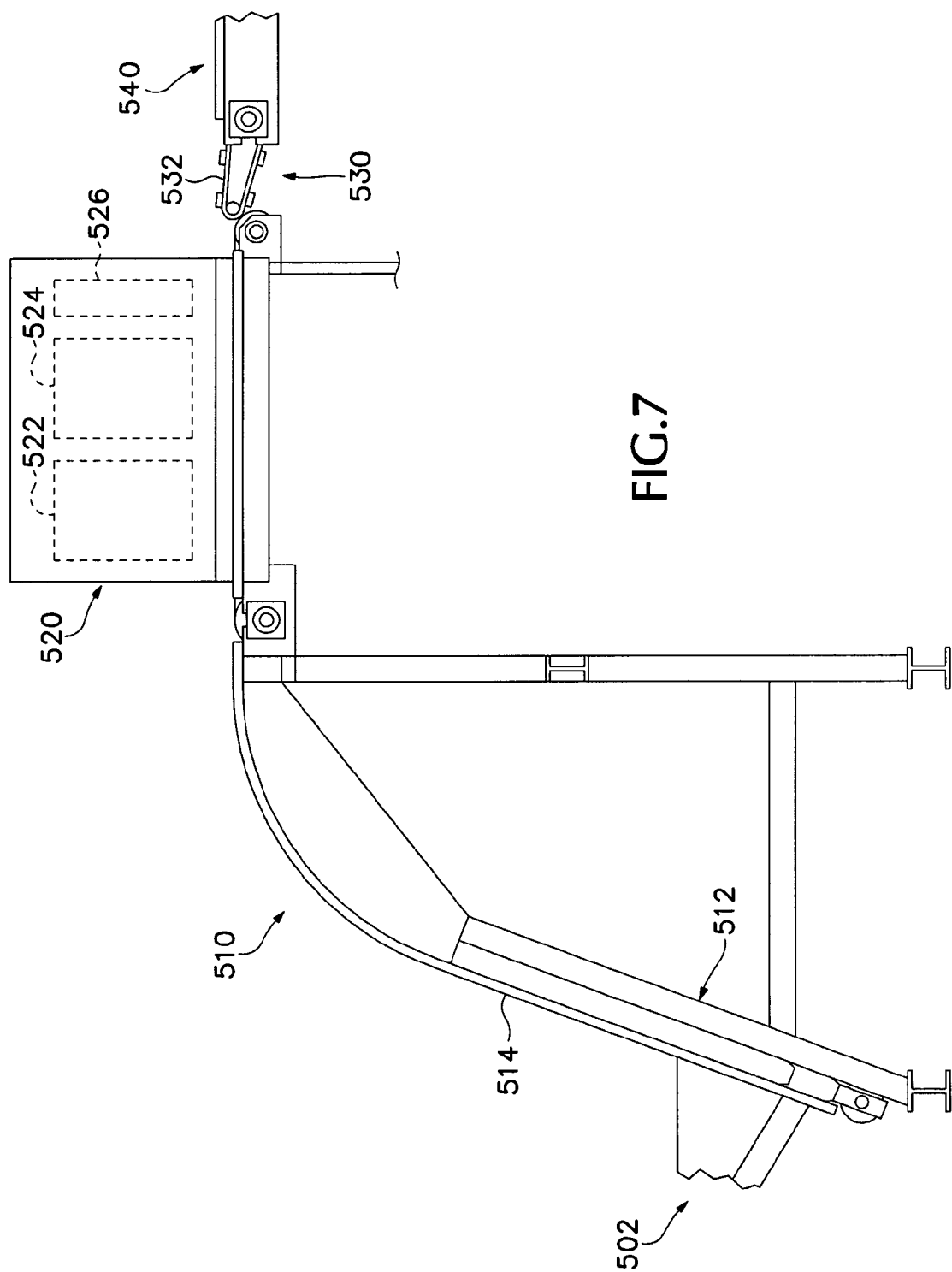
FIG. 7 is a somewhat schematic side view of the sticker sensing and sorting mechanism of FIG. 6.

FIG. 4 is a schematic flow diagram illustrating a method of scanning stickers according to another aspect of the present invention. FIG. 5 is a schematic block diagram illustrating the primary components of a sticker scanner and sorter according to a preferred embodiment. FIGS. 6 and 7 are somewhat schematic top elevation and side views of a sticker scanning and sorting apparatus according to a still further aspect of the present invention.

Referring first to FIG. 4, a process for removing defective stickers preferably begins by accepting stickers into a scanning and/or sensing device or system. The scanner preferably scans or senses physical properties of the stickers to identify defective stickers. The physical properties could include, for instance, size (e.g., length, width, thickness), shape, wetness, iciness, and/or other physical characteristics. The scanning system then preferably identifies defective stickers based on irregularities or defects in their detected physical properties. The defective stickers can then be removed or otherwise rejected from the system before passing the good stickers from the scanning system.

The size, shape, moisture content, and icy condition of the "stickers" are frequently important when processing the stickers for placement between layers of lumber, or any other material. These characteristics can affect their performance in the machinery, for example, as well as subsequent treatment processes. If the stickers have physical properties that cause them to jamb or misfeed in automatic gathering or sticker placing machinery, it causes down time and requires increased maintenance. If the stickers have physical properties (such as being too thin, too short, or having excess moisture) that cause poor performance in the lumber drying process, it is costly in terms of lumber quality degradation and increased processing time requirements. Therefore, by removing defective stickers from the system, jambs or other misfeeds can be more effectively prevented, and other process characteristics can also be improved.

Referring now to FIGS. 5-7, a scanning and/or sensing system 500 is preferably configured to detect the physical properties of stickers, such as lumber dry kiln stickers. Referring to FIG. 5, the scanning system 500 preferably includes an infeed system 510, a scanner and/or sensor 520 containing one or more scanning and/or sensing devices, a sorting system 530, and an outfeed system 540. Electrical and/or electronic controls (not shown) are preferably used to control the scanning system 500 and are further preferably configured to accept or reject the stickers based on their detected physical characteristics. The scanning system 500 can be used in many different applications, for example, in mechanical stick gathering, sticker placing, and/or lumber drying applications.

The scanning system 500 preferably scans and senses each sticker being processed using the scanner and/or sensor 520 and either determines that it is a good sticker and allows it to continue through the process, or rejects it out of the system as a defective sticker using the sorting system 530. The scanner/sensor 520 may utilize photo-cells, laser detectors, moisture detectors, mechanical shoes with encoders, or any number of scanning and/or sensing devices and methods to detect the shape and condition of the stickers and process them accordingly.

In lumber applications, the scanning system 500 be utilized in any location that processes the stickers in the course of stacking and sticking lumber, drying lumber, or desticking the loads and gathering stickers after drying for further processing. In a most preferred embodiment, the scanning system 500 is arranged in proximity to an infeed system of a sticker placing machine (such as that described previously) to scan and sort the stickers being fed into the sticker placing machine.

Referring additionally to FIGS. 6 and 7, the infeed system 510 of the scanning system 500 may include an unscrambler 512 configured to separate the stickers and arrange them on a chain conveyor with bars or lugs 514 to be fed into the scanner 520. The unscrambler 512 in this embodiment communicates with a sticker supply 502 and preferably has a steep incline to permit excess stickers to fall from the chain lugs or bars 514 as the conveyor 514 raises the remaining stickers to the plane of the scanner 520.

The conveyor 514 draws the stickers into the scanning device 520. In the scanning device 520, various scanners and/or sensors 522/524/526 can be used to detect the physical properties of the stickers. These scanners and sensors preferably includes, for instance, a photo-cell or laser detector 522 to detect the shape and size of the stickers, a moisture detector 524 to detect the moisture content of stickers, and may further include any additional or alternative device 526 for detecting important physical properties of the stickers for the desired application. The detecting equipment 522/524/526 in the scanner 520 identify defective stickers and communicate with a sorting system 530 to reject defective stickers from the system while permitting acceptable stickers to pass through.

The sorting system 530 of the preferred embodiment shown in FIGS. 6 and 7 preferably includes a drop-out section on the conveyor belt or chain drive. In this case, selection arms 532 are preferably provided which raise to drop defective stickers from the system and lower to pass acceptable stickers through to the outfeed system 540. The selection arms 532 preferably also include a chain drive or conveyor belt to keep the good stickers moving toward the outfeed system 540. The outfeed system 540 can include conveyor belt or chain drive that directs the good stickers to an infeed system of the sticker placer machine 200 (see FIGS. 2A-2H).

Having described and illustrated the principles of the invention in a preferred embodiment thereof, it should be apparent that the invention can be modified in arrangement and detail without departing from such principles. It should be appreciated, for instance, that applications other than lumber mills may benefit from the invention. For instance, insertion of slats between layers of other materials such as plywood, metal, or agricultural products may also be beneficial. We therefore claim all modifications and variation coming within the spirit and scope of the following claims.

What is claimed is:

1. A sticker placer configured to place stickers onto a layer of lumber accumulated from a lumber stacking device having a stacking mechanism that is configured to accumulate a layer of lumber, wherein a length of said lumber is oriented in a direction transverse to a direction of movement of the lumber, said sticker placer comprising:
a plurality of slat holders arranged separate from the stacking mechanism of the lumber stacking device in complementary-operated pairs, wherein a length of each of the slat holders in each complementary-operated pair is arranged in a vertical plane that is transverse to the length of the lumber such that one slat holder passes above the other slat holder in the complementary-operated pair during operation of the sticker placer, and wherein the slat holders deliver the stickers to the layer of lumber during operation;
a slat loader configured to transfer stickers to one or more of the slat holder pairs;
a slat feeding device configured to supply slats to the slat loader;
a plurality of slat holder arms arranged having a length that is transverse to the length of the lumber, wherein the slat holder arms move the slat holders in a forward direction toward the layer of lumber accumulated from the lumber stacking device and a rearward direction away from the layer of lumber accumulated from the lumber stacking device during operation of the sticker placer;
one or more horizontal positioners for moving the slat holder arms in the forward and rearward directions;
one or more vertical positioners for controlling a vertical position of the slat holders; and
a control system for electronically controlling the operation of the one or more horizontal positioners and the one or more vertical positioners such that each slat holder in a complementary-operated pair can deliver a sticker to the layer of lumber at a different time than the other slat holder in the complementary-operated pair without interfering with the movement of the other slat holder.

2. A sticker placer according to claim 1, further comprising a horizontal position detecting device for detecting the horizontal position of one or more of the slat holder arms at any point along its course of travel.

3. A sticker placer according to claim 2, wherein the control system is configured to electronically profile the speed and vertical movement of the slat holders in relation to their horizontal position by selecting a speed and vertical position for the slat holders based on the horizontal position.

4. A device according to claim 1, wherein the slat loading means comprises a release device and is arranged to drop the slats directly from a slat accumulation magazine into one or more of the slat holders.

5. A sticker placer according to claim 1, wherein the slat loader comprises an accumulation magazine arranged above the slat holders that is configured to transfer stickers into one of the slat holders.

6. A sticker placer according to claim 1, wherein the slat loader comprises a rotary diverter configured to transfer stickers from an accumulation magazine to one or more of the slat holders.

7. A sticker placer according to claim 1, wherein the slat loader comprises a rotary diverter configured to transfer stickers from a conveyor to one or more of the slat holders.

8. A sticker placer according to claim 1, wherein the control system continuously tracks the position of the slat holder arms during their entire course of forward and rearward travel and electronically profiles the motion of the slat holders by varying the speed of the slat holder arms during their forward and rearward travel based on the position of the slat holder arms.

9. A sticker placer according to claim 8, wherein the control system further controls the vertical position of the slat holders in relation to their forward and rearward positions, such that a vertical position of one of the slat holders in a complementary-operated pair is different than a vertical position of the other slat holder in the complementary-operated pair when they are at the same horizontal position.

10. A sticker placer according to claim 1, further comprising a hard-coupled mechanical connection between slat holder arms in each slat holder pair, wherein the hard-coupled mechanical connection controls the relative movement between the slat holder arms in each slat holder pair such that one slat holder arm is in a forward position when the other slat holder arm is in a rearward position.

11. A sticker placer according to claim 10, wherein the hard-coupled mechanical connection comprises a gear rack and pinion gear activating mechanism arranged on each slat holder arm.

12. A sticker placer according to claim 1 wherein the one or more horizontal positioners comprise at least one pneumatic or hydraulic cylinder for each slat holder pair.

13. A sticker placer according to claim 1, wherein the one or more vertical positioners comprise at least one vertical positioner for each slat holder pair.

14. A sticker placer configured to place stickers onto a layer of material accumulated from a material stacking device that forms a material package, wherein said material is arranged in a lengthwise direction within the material package, said sticker placer comprising:
- a first set of sticker holders arranged separate from the material stacking device and configured to receive a first set of stickers in a lengthwise orientation substantially perpendicular to the lengthwise direction of the material arranged in the material package and substantially in line with a direction of travel of a first positioning device that positions the first set of sticker holders, wherein the first set of sticker holders is configured to receive a plurality of stickers from a sticker supply while the first positioning device positions the first set of sticker holders in a first rearward position that is away from the layer of material and to deposit the plurality of stickers directly onto the material package being formed by the material stacking device while the first positioning device positions the first set of sticker holders in a second forward position that is proximal to the layer of material; and
- a second set of sticker holders arranged separate from the material stacking device and configured to receive a second set of stickers in a lengthwise orientation substantially perpendicular to the lengthwise direction of the material arranged in the material package and substantially in line with a direction of travel of a second positioning device that positions the second set of sticker holders, wherein the second set of sticker holders is configured to receive a plurality of stickers from the sticker supply while the second positioning device positions the second set of sticker holders in a first rearward position that is away from the layer of material and to deposit the plurality of stickers directly onto the material package being formed by the material stacking device while the second positioning device positions the second set of sticker holders in a second forward position that is proximal to the layer of material,
- wherein, during operation of the sticker placer, the first positioning device positions the first set of sticker holders in the first position at a different time than the second positioning device positions the second set of sticker holders in the first position, and
- wherein corresponding sticker holders in the first and second set of sticker holders are arranged in a common vertical plane such that the sticker holders are configured to remain within the common vertical plane and to pass over or under one another during operation of the sticker placer.

15. A sticker placer according to claim 14, further comprising an electronic control system for controlling the horizontal and vertical movement of the first and second sticker holders between their respective first and second positions, such that a vertical position of one of the sticker holders in a complementary-operated pair is different than a vertical position of the other sticker holder in the complementary-operated pair when both sticker holders are at the same horizontal position.

16. A sticker placer according to claim 14, further comprising:
- one or more horizontal positioners for controlling the horizontal movement of the first and second set of sticker holders; and
- an electronic control system configured to electronically profile the movement of the first and second set of sticker holders.

17. A sticker placer according to claim 16, further comprising one or more vertical positioners configured to control the vertical movement of the first and second set of sticker holders, wherein the electronic control system is further configured to control a vertical position of the first and second set of sticker holders during their horizontal travel.

18. A sticker placer according to claim 14, wherein corresponding sticker holders in the first and second sets of sticker holders are arranged in a common vertical plane such that a sticker holder in the first set of sticker holders must be moved out of the first position before a corresponding sticker holder in the second set of sticker holders can be moved to occupy the first position.

19. A sticker placer according to claim 14, further comprising:
- a scanning system configured to detect and reject defective stickers;
- an infeed system configured to receive good stickers from the scanning system; and
- a transfer system for transferring stickers from the infeed system to a plurality of sticker holders.

20. A sticker placer, comprising:
- a plurality of sticker holders arranged in complementary-operating pairs, wherein a first sticker holder is configured to receive a sticker from a sticker supply while arranged in a first position at approximately the same time a second sticker holder is arranged in a second position to deposit a sticker in a material package being formed by a material stacker, and wherein the second sticker holder is configured to receive a sticker from a sticker supply while arranged in a first position at approximately the same time the first sticker holder is arranged in a second position to deposit a sticker in the material package being formed; and
- a sticker rake-off system comprising a plurality of rake-off members arranged in a rake-off position behind the stickers to apply a force on a rearward end of the stickers to retain the stickers within the package while the plurality of sticker holders are being moved from the second positions to the first positions,
- wherein the rake-off members are further arranged in a non-obstructing position so as not to block the movement of stickers into the material package while the plurality of sticker holders are being moved from the first positions into the second positions.

21. A sticker placer according to claim 20, wherein the rake-off members further comprise a cam such that the rake-off members are moved from the non-obstructing position to the rake-off position through a cam movement.

22. A sticker placer according to claim 20, wherein the rake-off members further comprise a linear transport member such that the rake-off members are moved between the non-obstructing position and the rake-off position through a linear movement.

23. A sticker placer according to claim 20, wherein the rake-off members further comprise one or more electrically or electronically-controlled positioning devices and are configured to be moved between the non-obstructing position and the rake-off position using the one or more electrically or electronically-controlled positioning devices.

24. A sticker placer according to claim 23, comprising a single positioning device for all of the rake-off members, wherein all of the rake-off members are configured to be moved from the non-obstructing position to the rake-off position using a single positioning device.

25. A sticker placer configured to place stickers onto a material package being formed by a material stacker, comprising:
- a plurality of sticker holders arranged in complementary-operating pairs, wherein each sticker holder comprises a lengthwise orientation substantially parallel to a direction of movement of the sticker holders during operation of the sticker placer;

a first positioner and a second positioner separately operated from the first positioner, wherein the first positioner is configured to arrange a first sticker holder in a first position to receive a sticker from a sticker supply at approximately the same time the second positioner positions a second sticker holder in a second position to deposit a sticker in the material package being formed, wherein the second positioner is configured to position the second sticker holder in a first position to receive a sticker from a sticker supply at approximately the same time the first positioner arranges the first sticker holder in a second position to deposit a sticker in the material package being formed, and wherein the first sticker holder and the second sticker holder are arranged lengthwise in a common vertical plane such that the sticker holders are configured to pass over or under one another in a lengthwise direction during operation of the sticker placer; and a sticker rake-off system comprising a plurality of rake-off members configured to apply a force to a rearward end of the stickers as the sticker holders are retracted from the material package being formed to hold the stickers in place in the material package.

26. A sticker placer according to claim 25, wherein the first position of the first sticker holder is substantially the same as the first position of the second sticker holder.

27. A sticker placer according to claim 25, wherein the second position of the first sticker holder is substantially the same as the second position of the second sticker holder.

28. A sticker placer according to claim 25, wherein the rake-off members are configured to be moved into a rake-off position to retain the stickers within the package while the plurality of sticker holders are being moved from the second positions to the first positions, and wherein the rake-off members are further configured to be moved into a non-obstructing position so as not to block the movement of stickers into the material package while the plurality of sticker holders are being moved from the first positions into the second positions.

29. A sticker placer according to claim 25, further comprising a rotary diverter configured to place stickers into the sticker holders, said rotary diverter comprising a finger device configured to hold the sticker in place within the rotary diverter until the sticker is arranged in the sticker holder.

30. A sticker placer for placing stickers between layers in a package being formed by a material stacker, said sticker placer comprising:

a first sticker holder arranged on a first sticker holder arm, wherein the first sticker holder arm is attached to and configured to be moved by a first horizontal positioning device and a vertical positioning device, separate from the first horizontal positioning device, to receive a sticker from a sticker supply and to deliver the sticker to the package being formed between a first and a second layer in the package but not between a second and a third layer in the package;

a second sticker holder arranged on a second sticker holder arm, wherein the second sticker holder arm is attached to and configured to be moved by a second horizontal positioning device and a vertical positioning device, separate from the second horizontal positioning device, to receive a sticker from the sticker supply and to deliver the sticker to the package being formed between the second and the third layer in the package but not between the first and second layer in the package, wherein the first sticker holder and the second sticker holder are configured to travel within substantially the same vertical plane; and an electronic control unit configured to control the horizontal and vertical positioning devices such that the first sticker holder places stickers between a first set of alternating layers in the package being formed and the second sticker holder places stickers between a second set of alternating layers in the package being formed.

31. A sticker placer according to claim 30, further comprising a position detecting device configured to detect a horizontal position of the first sticker holder at any position along its course of travel.

32. A sticker placer according to claim 31, wherein the electronic control unit is configured to vary the speed of the sticker holder based on its horizontal position such that its speed can be accelerated and decelerated gradually at the start and stop of its linear travel.

33. A sticker placer according to claim 30, wherein the first sticker holder and the second sticker holder are arranged in a common vertical plane such that the first sticker holder is configured to pass over or under the second sticker holder during operation of the sticker placer.

34. A sticker placer according to claim 33, wherein the electronic control unit independently controls movement of the first and second sticker holders.

* * * * *